United States Patent
Yustick et al.

(10) Patent No.: US 8,998,263 B1
(45) Date of Patent: Apr. 7, 2015

(54) VEHICLE STRUCTURAL SUPPORT ASSEMBLY WITH A SPLIT INNER PANEL

(71) Applicant: Ford Motor Company, Dearborn, MI (US)

(72) Inventors: Robert Franklin Yustick, Dearborn, MI (US); Alexandre Cruz Silva, Bahia (BR); Nagaraj Mariyappa, Rochester Hills, MI (US); Diego Freitas de Araújo, Lauro de Freitas (BR)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 14/153,668

(22) Filed: Jan. 13, 2014

(51) Int. Cl.
*B62D 25/02* (2006.01)

(52) U.S. Cl.
CPC ..................................... *B62D 25/02* (2013.01)

(58) Field of Classification Search
USPC .................. 296/193.06, 193.05, 203.03, 205, 296/203.01; 280/807
See application file for complete search history.

(56) References Cited

U.S. PATENT DOCUMENTS

| | | | |
|---|---|---|---|
| 5,382,071 A | 1/1995 | Enning et al. | |
| 6,332,643 B1 | 12/2001 | Sukegawa et al. | |
| 8,246,108 B2 | 8/2012 | Itakura | |
| 8,251,439 B2 * | 8/2012 | Yasuda | 296/193.06 |
| 8,662,567 B2 * | 3/2014 | Aul et al. | 296/193.06 |
| 2006/0208537 A1 * | 9/2006 | Dingman et al. | 296/193.05 |
| 2008/0315628 A1 * | 12/2008 | Obayashi | 296/193.06 |
| 2010/0194146 A1 * | 8/2010 | Nishimura et al. | 296/193.06 |
| 2010/0194147 A1 * | 8/2010 | Aul et al. | 296/193.06 |

* cited by examiner

*Primary Examiner* — Drew Brown
(74) *Attorney, Agent, or Firm* — Brooks Kushman P.C.

(57) ABSTRACT

A structural support assembly for a vehicle that has a roof and a rocker assembly. The structural support assembly includes an outer panel extending from the rocker assembly to the roof, an inner reinforcement including an upper panel and a lower panel. A seat belt retractor is assembled to the structural support assembly between the upper panel and the lower panel of the inner reinforcement. The upper panel and the lower panel are separate parts that are assembled to the outer panel in a spaced apart relationship.

17 Claims, 4 Drawing Sheets

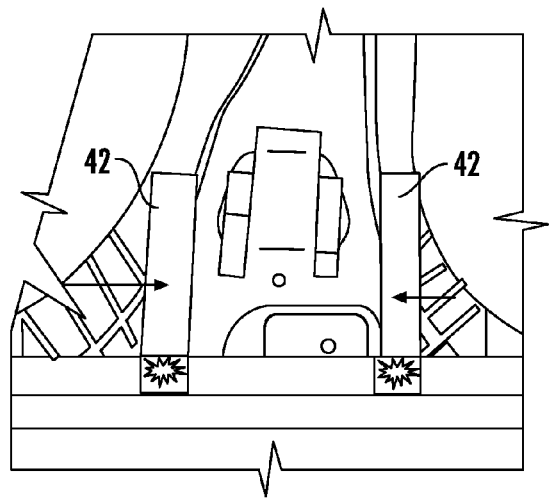
FIG. 5
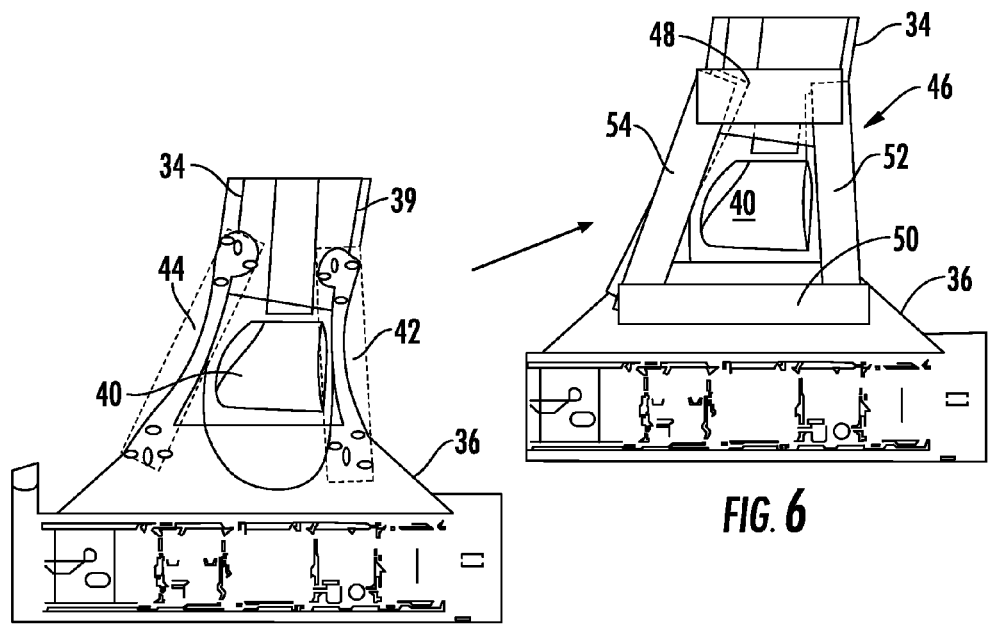
FIG. 6
FIG. 4

VEHICLE STRUCTURAL SUPPORT ASSEMBLY WITH A SPLIT INNER PANEL

TECHNICAL FIELD

This disclosure relates to a split inner panel of a vehicle structural support assembly that is disposed between a roof and a rocker assembly of the vehicle.

BACKGROUND

Vehicles include support structures, such as A, B, or C pillars. A B-pillar is a support structure positioned between a roof and a rocker assembly. B-pillars contribute to the weight of the vehicle and a B-pillar design is desired with reduced weight. A B-pillar consists of an outer panel and an inner panel. A blank for an inner panel is trimmed to create a recess and provide access for installing and packaging a seat belt retractor. The material trimmed away to create the recess is wasted scrap material. The blanking and trimming processes contribute to the part fabrication and assembly costs, and the wasted material contributes to overall manufacturing costs.

The above problems and other problems are addressed by this disclosure as summarized below.

SUMMARY

An aspect of the present disclosure relates to a structural support assembly for a vehicle that has a roof and a rocker assembly. The structural support assembly includes an outer panel extending from the rocker assembly to the roof and an inner reinforcement. The inner reinforcement includes an upper panel and a lower panel. A seat belt retractor is assembled to the structural support assembly between the upper panel and the lower panel of the inner reinforcement. The upper panel and the lower panel are separate parts.

Other aspects of the structural support assembly include a lower panel that may be formed from a material having a higher tensile strength than the upper panel. The lower panel may also be formed from a material that is thicker than the upper panel. The structural support assembly may include a lower panel that is formed of a sheet material having a gauge thickness that is greater than the gauge thickness of a sheet metal panel that forms the upper panel. The structural support assembly may further include a first strap connected to the upper panel and the lower panel in front of the seat belt retractor and a second strap connected to the upper panel and the lower panel in back of the seat belt retractor. The first strap and the second strap may be formed of a sheet metal panel having a gauge thickness that is greater than the gauge thickness of a sheet metal panel that forms the upper panel.

Other aspects of the structural support assembly may further include a frame shaped connector plate having a top portion attached to the upper panel, a base portion attached to the lower panel, a front portion extending between the top portion and the lower panel in front of the seat belt retractor, and a back portion extending between the top portion and the lower panel in back of the seat belt retractor. The structural support assembly may have a rocker flange that extends upwardly from the rocker assembly, and the lower panel of the inner reinforcement may have a lower flange that is attached to an outer surface of the rocker flange. The upper panel of the inner reinforcement may have an upper edge attached to the roof that has a fore-and-aft length that is the smaller than the fore-and aft length of the upper panel below the upper edge. The lower panel of the inner reinforcement of the structural support assembly adjacent the seat belt retractor may have a fore-and-aft length that is the same as the fore-and-aft length at a location where the inner reinforcement is attached to the rocker assembly.

Another aspect of the present disclosure relates to a structural support assembly that includes a split inner panel disposed between a roof panel and a rocker panel of the vehicle. The split inner panel includes an upper panel adapted to connect to the roof panel and a lower panel spaced apart from the upper panel and adapted to connect to the rocker panel. The lower panel provides an anchor for a seat belt retractor.

Another aspect of the present disclosure relates to a structural support assembly that includes a split inner panel disposed between a roof panel and a rocker panel of the vehicle. The split inner panel includes an upper panel connected to the roof panel and a lower panel spaced apart from the upper panel and connected to the rocker panel. The structural support assembly includes a rocker flange that extends upwardly from the rocker panel. The lower panel of the split inner panel has a lower flange that is attached to an outer surface of the rocker flange.

The above aspects and other aspects of this disclosure are described below in greater detail with reference to the attached drawings.

BRIEF DESCRIPTION OF THE DRAWINGS

FIG. 4 is a fragmentary side elevation view of a pair of straps connecting the upper panel and the lower panel of the inner reinforcement.

FIG. 5 is a fragmentary side elevation view of an alternative embodiment showing a pair of straps connecting the upper panel and the lower panel of the inner reinforcement.

FIG. 6 is a fragmentary side elevation view of a frame shaped connector attached to the upper panel and the lower panel of the inner reinforcement.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
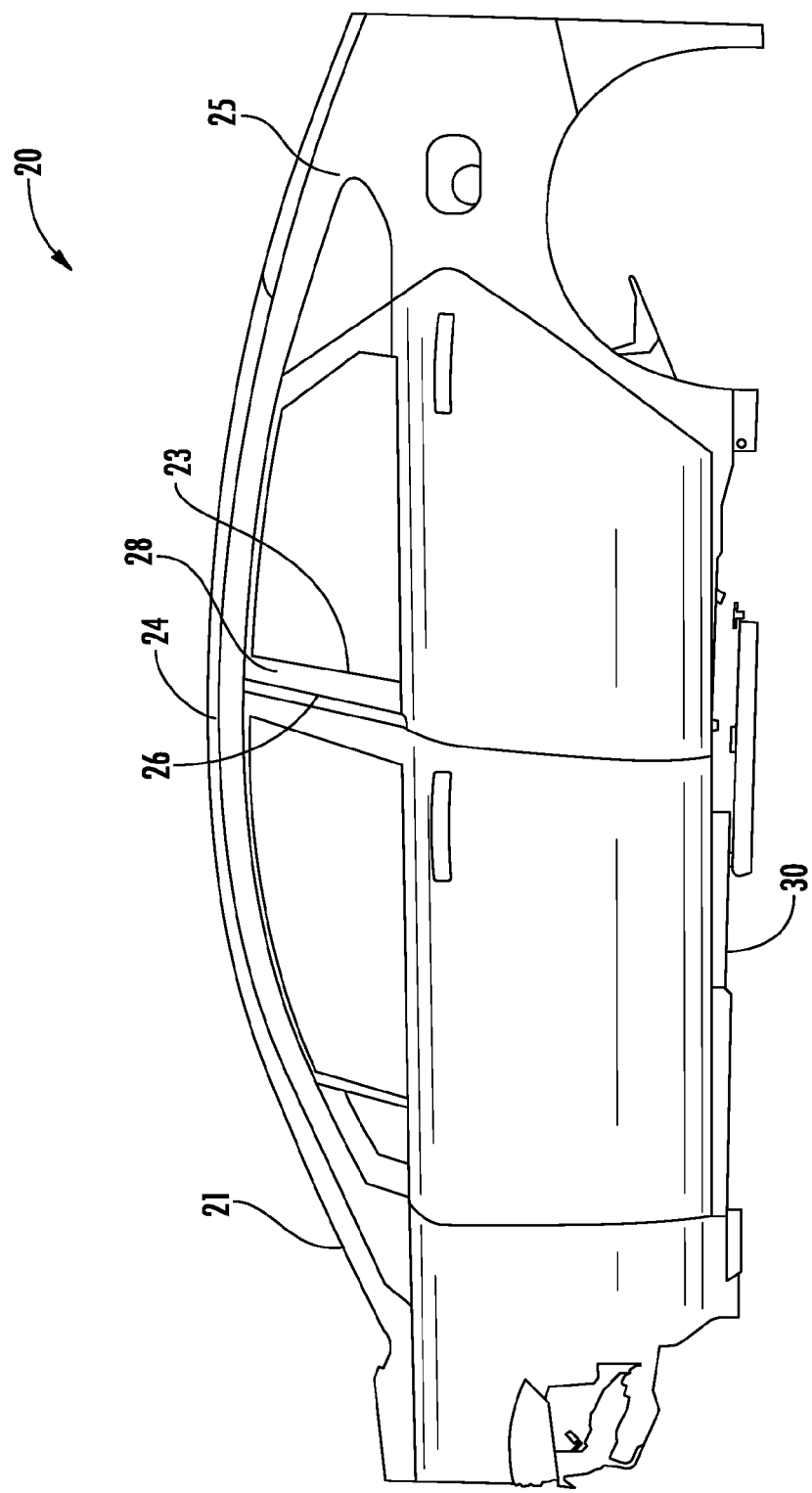
FIG. 1 is a fragmentary side elevation view of a vehicle having a structural support assembly of the present disclosure.

FIG. 1 shows a vehicle 20 having a pair of A-pillars 21, B-pillars 23, and C-pillars 25 supporting the roof 24. The A-pillars, B-pillars and C-pillars are generally referred to as a structural support assembly 26. The type of vehicle 20 that is shown is a sedan but the structural support assembly 26 may be incorporated with any type of vehicle, including those with more or less supporting pillars. Each structural support assembly 26 includes an outer panel 28 extending from the rocker assembly 30 to the roof 24.

Figure 2:
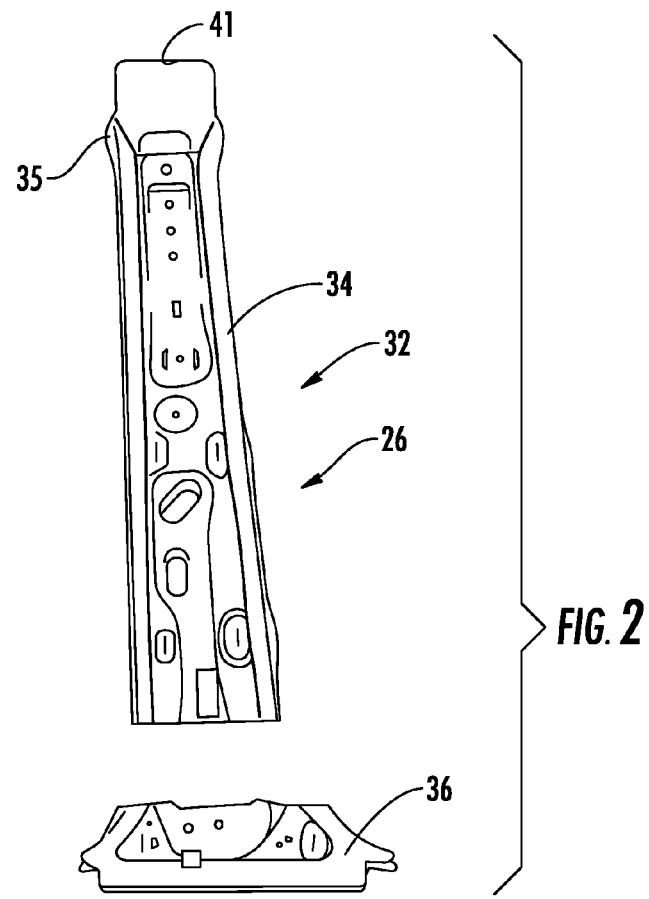
FIG. 2 is a side elevation view of an inner reinforcement of the B-pillar structural support assembly.
Figure 3:
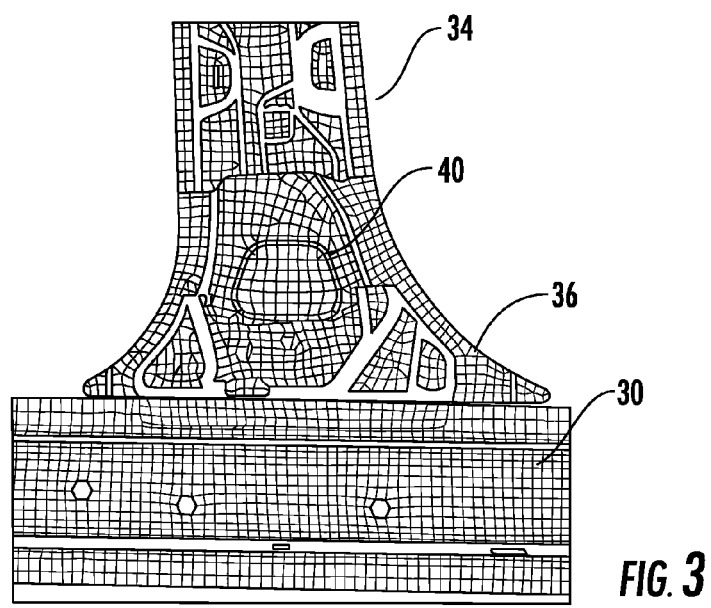
FIG. 3 is a fragmentary side elevation view of a part of upper panel and a lower panel of the inner reinforcement of FIG. 2.

Referring to FIGS. 2 and 3, the structural support assembly 26 includes an inner reinforcement 32 positioned inboard of the vehicle and opposite the outer panel 28. The inner reinforcement 32 includes an upper panel 34 and a lower panel 36 that are separate parts. The inner reinforcement 32 may be alternatively referred to as a split inner panel. The lower panel 36 is preferably made from a material that has a higher tensile strength than the material for the upper panel 34. The lower panel 36 may also be made from a sheet metal that has a greater gauge thickness than the upper panel 34. The upper panel 34 provides surfaces for attaching trim panels, wiring grounds, clips and upper seat belt anchors. The lower panel 36 provides surfaces for attaching trim panels, wiring grounds, clips and lower seat belt anchors.

By manufacturing the upper panel 34 as a separate part from the lower panel 36, there is no need to cut out and discard a piece of the inner reinforcement 32 to create a recess for a seat belt retractor 40. The upper panel 34 and the lower panel 36 of the split inner panel 32 are spaced apart to accommodate the seat belt retractor 40. They may be made from blanks that are rectangular, which reduce the size and cost of the die. The split inner panel 32 promotes optimal material utilization during manufacturing and minimizes material and assembly costs. The split inner panel 32 also reduces the weight of the vehicle 20.

Another benefit of a split inner panel 32 is the seat belt retractor 40 attaches to either the upper panel 34 or the lower panel 36 instead of the sides of the inner reinforcement that define the recess for accessing the seat belt retractor. With the seat belt retractor 40 being attached to the upper panel 34 or lower panel 36, it does not pull on the sides of the inner reinforcement. The sides of a conventional one-piece B-pillar inner reinforcement may tear in a side impact. Yet another benefit of the split inner panel 32 is that it provides more room for seat belt retractor installation than conventional B-pillars.

The length of the structural support assembly 26 at the upper edge 35 of the upper panel 34 that is attached to the roof has a fore-and-aft length that is the smaller than the fore-and aft length of the upper panel below the upper edge 35. The lower panel 36 adjacent to the seat belt retractor may have a fore-and-aft length that is the same as the fore-and-aft length of the lower panel at a location where the inner reinforcement is attached to the rocker assembly.

In certain embodiments, straps may connect the upper panel 34 to the lower panel 36. More specifically, referring to FIG. 4, the upper panel 34 is attached to the lower panel 36 by a first strap 42 that extends from the upper panel 34 to the lower panel 36. The first strap 42 is positioned in front of the seat belt retractor 40. The upper panel 34 is further attached to the lower panel 36 by a second strap 44 that is positioned opposite to the first strap 42 in back of the seat belt retractor 40. The second strap 44 also extends from the upper panel 34 to the lower panel 36.

Referring to FIG. 5, an alternative embodiment of a structural support assembly is illustrated wherein the first strap 42 and the second strap 44 are simple rectangular straps that extend straight down and are not slanted.

Referring to FIG. 6, another embodiment of a structural support assembly includes a frame shaped connector plate 46 that attaches the upper panel 34 of the inner reinforcement 32 to the lower panel 36 of the inner reinforcement 32. The frame shaped connector plate 46 includes a top portion 48 attached to the upper panel 34, and a bottom portion 50 attached to the lower panel 36. A front portion 52 and a back portion 54 extend between the upper panel 34 and the lower panel 36. The front portion 52 is disposed in front of the seat belt retractor 40. The back portion 54 is disposed in back of the seat belt retractor 40 on the opposite side from the front portion 52. The front portion 52 and the back portion 54 may be slanted, or they may extend straight down.

Figure 7:
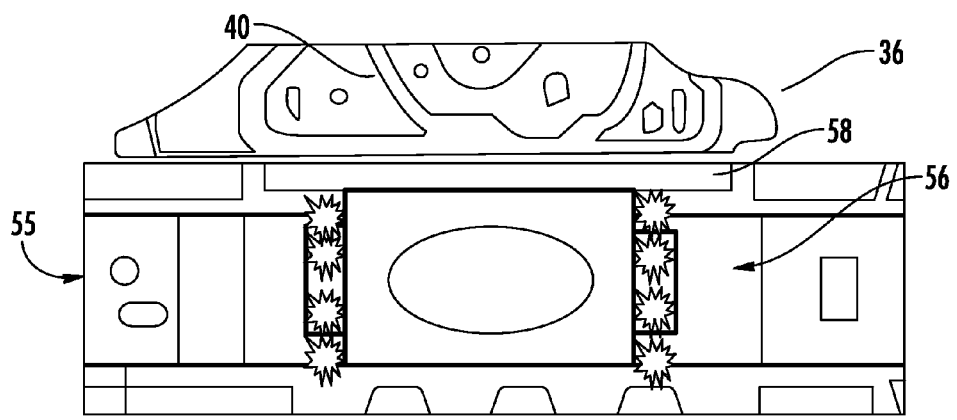
FIG. 7 is a fragmentary side elevation view of a lower panel of the inner reinforcement attached to a rocker panel.

Referring to FIG. 7, the structural support assembly includes a rocker panel 55 that has a lower inner panel 56 disposed below the lower panel 36 of the split inner panel 32 and a rocker flange 58. The lower inner panel 56 is attached to the lower panel 36 of the split inner panel 32. The lower inner panel 56 provides an anchor for a seat belt retractor 40 and a rocker bulkhead. The rocker flange 58 extends upwardly from the rocker panel 55. The lower panel 36 of the split inner panel has a lower flange 37 that is attached to an outer surface of the rocker flange 58. The lower inner panel 56 is shingled inboard of the rocker flange 58.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A structural support assembly for a vehicle having a roof and a rocker assembly comprising:
   an outer panel extending from the rocker assembly to the roof;
   an inner/upper panel attached to the outer panel;
   an inner/lower panel attached to the outer panel below the inner/upper panel, wherein the inner/upper panel and the inner/lower panel define a gap; and
   a seat belt retractor assembled within the gap.

2. The structural support assembly of claim 1 wherein the inner/lower panel is formed from a material having a higher tensile strength than the inner/upper panel.

3. The structural support assembly of claim 1 wherein the inner/lower panel is formed of a sheet metal panel having a gauge thickness that is greater than the gauge thickness of a sheet metal panel that forms the inner/upper panel.

4. The structural support assembly of claim 1 further comprising:
   a first strap connected to the inner/upper panel and the inner/lower panel in front of the seat belt retractor; and
   a second strap connected to the inner/upper panel and the inner/lower panel in back of the seat belt retractor.

5. The structural support assembly of claim 4 wherein the first strap and the second strap are formed of a sheet metal panel having a gauge thickness that is greater than the gauge thickness of a sheet metal panel that forms the inner/upper panel.

6. The structural support assembly of claim 1 further comprising a frame shaped connector plate having a top portion attached to the inner/upper panel, a base portion attached to the inner/lower panel and a front portion extending between the inner/upper panel and the inner/lower panel in front of the seat belt retractor, and a back portion extending between the inner/upper panel and the inner/lower panel in back of the seat belt retractor.

7. The structural support assembly of claim 1 wherein the rocker assembly has a rocker flange that extends upwardly from the rocker assembly, and the inner/lower panel has a lower flange that is attached to an outer surface of the rocker flange.

8. The structural support assembly of claim 1 wherein the inner/upper panel has an upper edge attached to the roof that has a fore-and-aft length that is smaller than fore-and aft length of the inner/upper panel below the upper edge.

9. The structural support assembly of claim 1 wherein a fore-and-aft length of the inner/lower panel adjacent the seat belt retractor is the same as a fore-and-aft length at a location where an inner/lower panel is attached to the rocker assembly.

10. A structural support assembly for a vehicle having a roof panel and a rocker panel comprising:
   an outer panel;
   a split inner reinforcement including an inner/upper panel connected to the roof panel and an inner/lower panel spaced from the inner/upper panel and connected to the rocker panel, and wherein the rocker panel includes a rocker flange that is attached to a lower flange of the inner/lower panel, and wherein the inner/lower panel provides an anchor for a seat belt retractor;
   a first strap connected to the inner/upper panel and the inner/lower panel in front of a seat belt retractor; and
   a second strap connected to the inner/upper panel and the inner/lower panel in back of the seat belt retractor.

11. The structural support assembly of claim 10, wherein the inner/upper panel has an upper edge attached to the roof panel that has a fore-and-aft length that is smaller than fore-and aft length of the inner/upper panel below the upper edge.

12. The structural support assembly of claim 10, wherein the inner/lower panel is formed from a material having a higher thickness than the inner/upper panel.

13. The structural support assembly of claim 10, wherein the inner/lower panel is formed of a sheet metal panel having a gauge thickness that is greater than the gauge thickness of a sheet metal panel that forms the inner/upper panel.

14. The structural support assembly of claim 10, wherein the first strap and the second strap are formed of a sheet metal panel having a gauge thickness that is greater than the gauge thickness of a sheet metal panel that forms the inner/upper panel.

15. The structural support of claim 10 further comprising a frame shaped connector plate having a top portion attached to the inner/upper panel and a base portion attached to the inner/lower panel, wherein the first strap extends between the inner/upper panel and the inner/lower panel in front of a seatbelt retractor, and the second strap extends between the inner/upper panel and the inner/lower panel in back of the seatbelt retractor.

16. A structural support assembly for a vehicle having a roof and rocker panel, the assembly comprising:
   an outer panel;
   a split inner reinforcement including an inner/upper panel connected to the roof and an inner/lower panel spaced from the inner/upper panel and connected to the rocker panel, wherein the rocker panel has a rocker flange that extends upwardly from the rocker panel, wherein the inner/lower panel has a lower flange that is attached to an outer surface of the rocker flange; and
   a frame shaped connector plate having a top portion attached to the inner/upper panel, a base portion attached to the inner/lower panel and a front portion extending between the inner/upper panel and the inner/lower panel in front of a seat belt retractor, and a back portion extending between the inner/upper panel and the inner/lower panel in back of the seat belt retractor.

17. The structural support assembly of claim 16, wherein the inner/lower panel is formed from a material having a higher tensile strength than the inner/upper panel.

* * * * *